US012324369B2

United States Patent
Momiyama

(10) Patent No.: US 12,324,369 B2
(45) Date of Patent: Jun. 10, 2025

(54) WORKING MACHINE WITH OPERATING ROD AND HANGING TOOL FOR SHOULDER BELT

(71) Applicant: YAMABIKO CORPORATION, Tokyo (JP)

(72) Inventor: Hiroshi Momiyama, Tokyo (JP)

(73) Assignee: YAMABIKO CORPORATION, Tokyo (JP)

(*) Notice: Subject to any disclaimer, the term of this patent is extended or adjusted under 35 U.S.C. 154(b) by 0 days.

(21) Appl. No.: 18/630,096

(22) Filed: Apr. 9, 2024

(65) Prior Publication Data
US 2024/0357961 A1   Oct. 31, 2024

(30) Foreign Application Priority Data
Apr. 27, 2023  (JP) .................... 2023-073098

(51) Int. Cl.
*A01D 34/84*  (2006.01)
*A01D 34/90*  (2006.01)
*F16M 13/04*  (2006.01)

(52) U.S. Cl.
CPC .......... *A01D 34/902* (2013.01); *A01D 34/84* (2013.01); *F16M 13/04* (2013.01)

(58) Field of Classification Search
CPC ...... A01D 34/902; A01D 34/78; B23K 37/04; B23K 2101/006; B62D 65/02; B62D 65/00; B23P 21/00; B23P 2700/50; G05B 2219/50375; Y10T 29/53052
See application file for complete search history.

(56) References Cited

U.S. PATENT DOCUMENTS

2009/0094841 A1* 4/2009 Nakaya ............... A01D 34/902
30/276

FOREIGN PATENT DOCUMENTS

| CN | 104114333 A | * 10/2014 | ............ A01D 34/73 |
|----|-------------|-----------|------------------------|
| CN | 105519301 A | 4/2016 | |
| EP | 0320576 A2 | 6/1989 | |
| EP | 4018806 A1 | 6/2022 | |
| JP | 2000-316349 A | 11/2000 | |
| WO | WO2015094027 A1 | 6/2015 | |

OTHER PUBLICATIONS

Extended European Search Report cited in corresponding European Patent Appln. No. 24172433.5 dated Sep. 16, 2024.

* cited by examiner

*Primary Examiner* — Nathaniel C Chukwurah
(74) *Attorney, Agent, or Firm* — BACON & THOMAS, PLLC

(57) ABSTRACT

A working machine includes: a working device mounted on a front end of an operating rod; a power device mounted on a base end of the operating rod; and the operating rod equipped with a hanging tool for a shoulder belt. The hanging tool includes a stopper. The stopper is configured to allow a pair of fastening portions to approach or be spaced from one another while sandwiching a circumference of the operating rod. The fastening portions include a through hole orthogonal to the longitudinal direction of the operating rod. A base end of an operating lever is pivotably supported around a rotating shaft parallel to the operating rod on the second end side of an operating shaft. The operating lever is rotated such that a front end of the operating lever approaches a side surface of the operating rod to fasten the stopper.

6 Claims, 9 Drawing Sheets

WORKING MACHINE WITH OPERATING ROD AND HANGING TOOL FOR SHOULDER BELT

CROSS-REFERENCE TO RELATED APPLICATIONS

The present application claims priority from Japanese Patent Application No. 2023-073098 filed on Apr. 27, 2023, and the entire contents of which are hereby incorporated by reference.

BACKGROUND

1. Technical Field

The present invention relates to a working machine with an operating rod, and a hanging tool for a shoulder belt of the working machine.

2. Related Art

A working machine such as a brush cutter for mowing work on the ground and a hedge trimmer for pruning high branches is equipped with a long operating rod. A working device is mounted on the front end of the operating rod, and a power device such as an engine and an electric motor is mounted on the base end of the operating rod. The operating rod of this working machine serves as a coupling rod to connect the power device and the working device, and includes a power transmission mechanism and wires arranged therein. In addition, a handle is provided on the operating rod. To perform work, a standing worker shakes the working rod while holding the handle by the hand to put the working device mounted on the front end of the operating rod to objects.

There has been known a working machine with the above-described operating rod provided with a hanging tool for a shoulder belt. The shoulder belt is used to reduce the burden of the hand and arm of the worker holding the handle, by bearing the weight of the working machine with the operating rod on the shoulder of the worker. For example, there has been known a hanging tool for a shoulder belt including a stopper. Part of the stopper is divided in the circumferential direction of the operating rod, and a screw s inserted into the divided positions and fastened to sandwich the operating rod. See, for example, Japanese Patent Application Laid-Open No. 2000-316349. The entire contents of this disclosure are hereby incorporated by reference.

SUMMARY

The present invention provides a working machine with an operating rod configured to perform work while a handle provided on the operating rod is held by a hand. The working machine includes: a working device mounted on a front end of the operating rod; a power device mounted on a base end of the operating rod; and the operating rod equipped with a hanging tool for a shoulder belt. The hanging tool includes: a hanging tool body including a connection hole to connect to the shoulder belt, and configured to be able to slide in a longitudinal direction of the operating rod while surrounding the operating rod; and a stopper coupled to the hanging tool body, and including a pair of fastening portions facing one another, the stopper being configured to allow the pair of fastening portions to approach or be spaced from one another while sandwiching a circumference of the operating rod. The fastening portions include a through hole orthogonal to the longitudinal direction of the operating rod. A first end of an operating shaft inserted into the through hole is retained not to fall off, and a second end is coupled to an operating lever. A base end of the operating lever is pivotably supported around a rotating shaft parallel to the operating rod on the second end side of the operating shaft. The operating lever is rotated such that a front end of the operating lever approaches a side surface of the operating rod to fasten the stopper. The operating lever is rotated such that the front end of the operating lever comes away from the side surface of the operating rod to unfasten the stopper.

DETAILED DESCRIPTION

Figure 1:
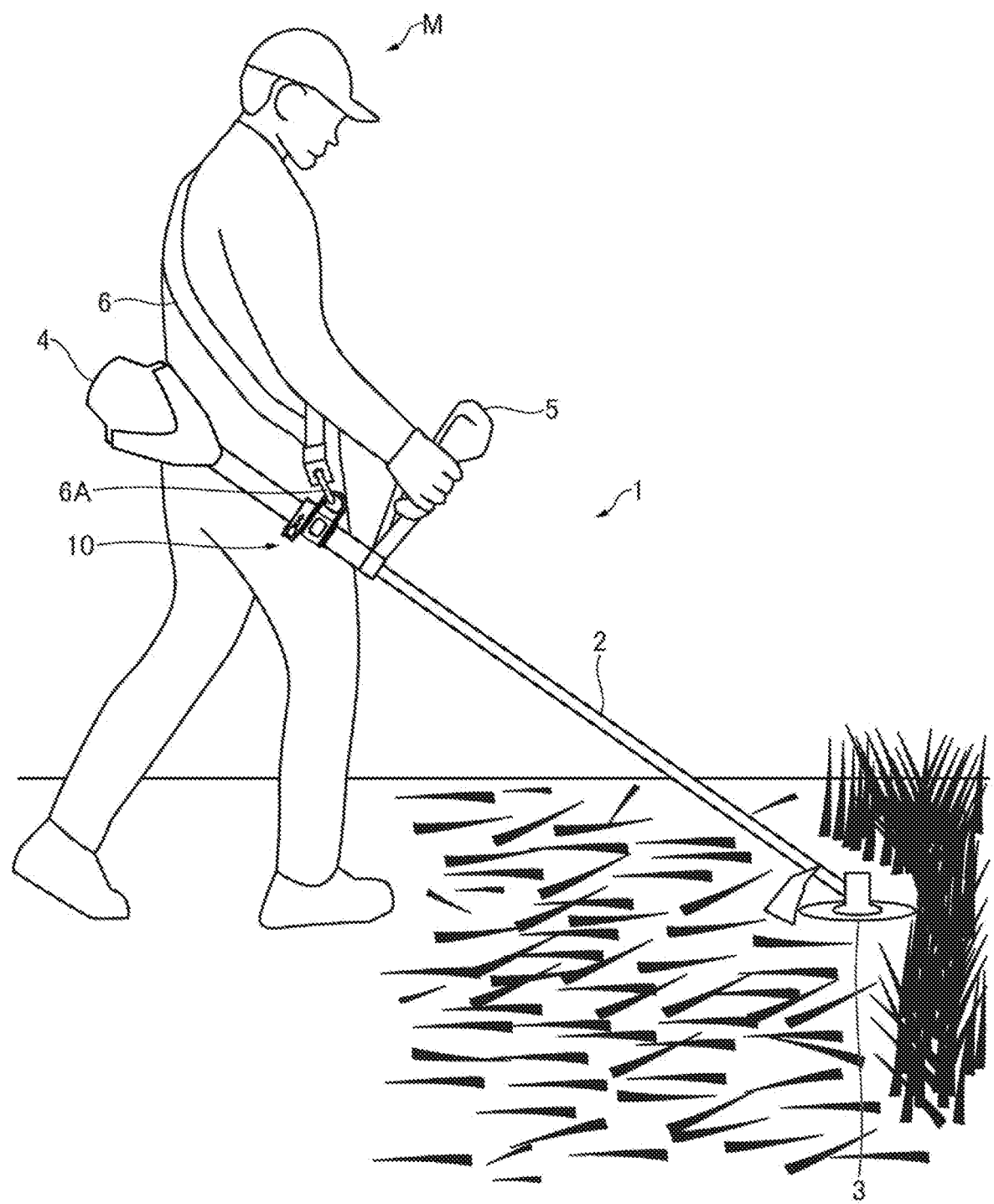
FIG. 1 illustrates a working state of a working machine with an operating rod.

The position of the hanging tool for a shoulder belt at which the hanging tool is mounted to the operating rod is set in consideration of the weight balance between the working device on the front end of the operating rod and the power device on the base end of the operating rod. However, the working device on the front end of the operating rod is often replaced with a different device having a different weight, for example, a disc-like cutting blade, and a resin cord. Also, the weight of the power device on the base end of the operating rod may vary depending on the state of fuel accumulation, and the mounting state of a battery.

In this case, the mounting position of the hanging tool for a shoulder belt is required to be changed as appropriate according to a change in the weight balance between the front end and the base end of the operating rod. Moreover, the mounting position of the hanging tool for a shoulder belt may also be required to be changed according to the height of the worker using the working machine.

However, as the above-described conventional art, the hanging tool including the stopper fastened with the screw needs complicated operation to loosen the screw in order to change the position of the stopper. Therefore, there is a problem that the position of the hanging tool for a shoulder belt cannot be speedily and easily changed.

To address this, it is conceivable that a mechanism is provided to release the fixing of the stopper by one operation. However, when the release of fixing is performed without the worker's intention by one operation, the operating rod is hung by the shoulder belt in an unstable state, and the burden on the hand and arm is suddenly increased, and therefore it is not possible to smoothly perform the work.

Moreover, there has been commonly known conventional art including a plurality of hook holes provided at different positions along the longitudinal direction of the operating rod. Here, the hook of the shoulder belt is hung on a hook hole at the appropriate position according to the weight balance between the front end and the base end of the operating rod. However, with this conventional art, it is not possible to precisely adjust the weight balance between the holes, and therefore not possible to hang the operating rod from the shoulder belt in an appropriate position.

The present invention is proposed to address the problem, and it is therefore an object of the invention to make it possible to speedily and easily change the position of the hanging tool for a shoulder belt according to the weight balance between the front end and the base end of the operating rod; to prevent release of the fixing of the hanging tool for a shoulder belt by unintended operation of the worker; and to hang the operating rod from the shoulder belt in an appropriate position.

Hereinafter, an embodiment of the present invention will be described with reference to the drawings. The same reference numbers in the different drawings indicate the same functional parts, and therefore repeated description for each of the drawings is omitted.

As illustrated in FIG. 1, a working machine with an operating rod (hereinafter, referred to as "working machine") 1 includes an operating rod 2. A working device 3 is mounted on the front end of the operating rod 2, and a power device 4 is mounted on the base end of the operating rod 2. A worker M performs work with the working machine 1, holding a handle 5 provided on the operating rod 2 by the hand. With the illustrated example, the working machine 1 is a brush cutter. However, the embodiment of the invention is not limited to this, but can be applied to various working machines, for example, a hedge trimmer.

The working device 3 of the working machine 1 includes a working tool such as a disc-like cutting blade, a reciprocating saw blade, and a resin cord, and a drive mechanism to drive the working tool. The working tool and the drive mechanism can vary in types, respectively. Meanwhile, the power device 4 of the working machine 1 includes, for example, an electric motor and a battery. The number of batteries and the size (weight) of a battery can be changed as appropriate. The power device 4 may include a fuel engine and a fuel tank. The operating rod 2 is a long hollow tube having a high rigidity. The operating rod 2 includes a power transmission mechanism to transmit the power of the power device 4 to the working device 3, and a wire to feed the electric power of the power device 4 to the working device 3.

The operating rod 2 is equipped with a hanging tool for a shoulder belt (hereinafter referred to as "hanging tool") 10. A hook 6A of a shoulder belt 6 is connected to the hanging tool 10. The shoulder belt 6 is hung on the shoulder of the worker M, and the hook 6A is connected to the hanging tool 10. By this means, the worker M can performs the work, bearing part of the weight of the working machine 1 on the shoulder. With a mechanism described later, the hanging tool 10 can move along the longitudinal direction of the operating rod 2, be fixed in any position, and be speedily and easily fixed, and released from being fixed. Hereinafter, an example of the configuration of the hanging tool 10 will be described in detail.

Figure 2:
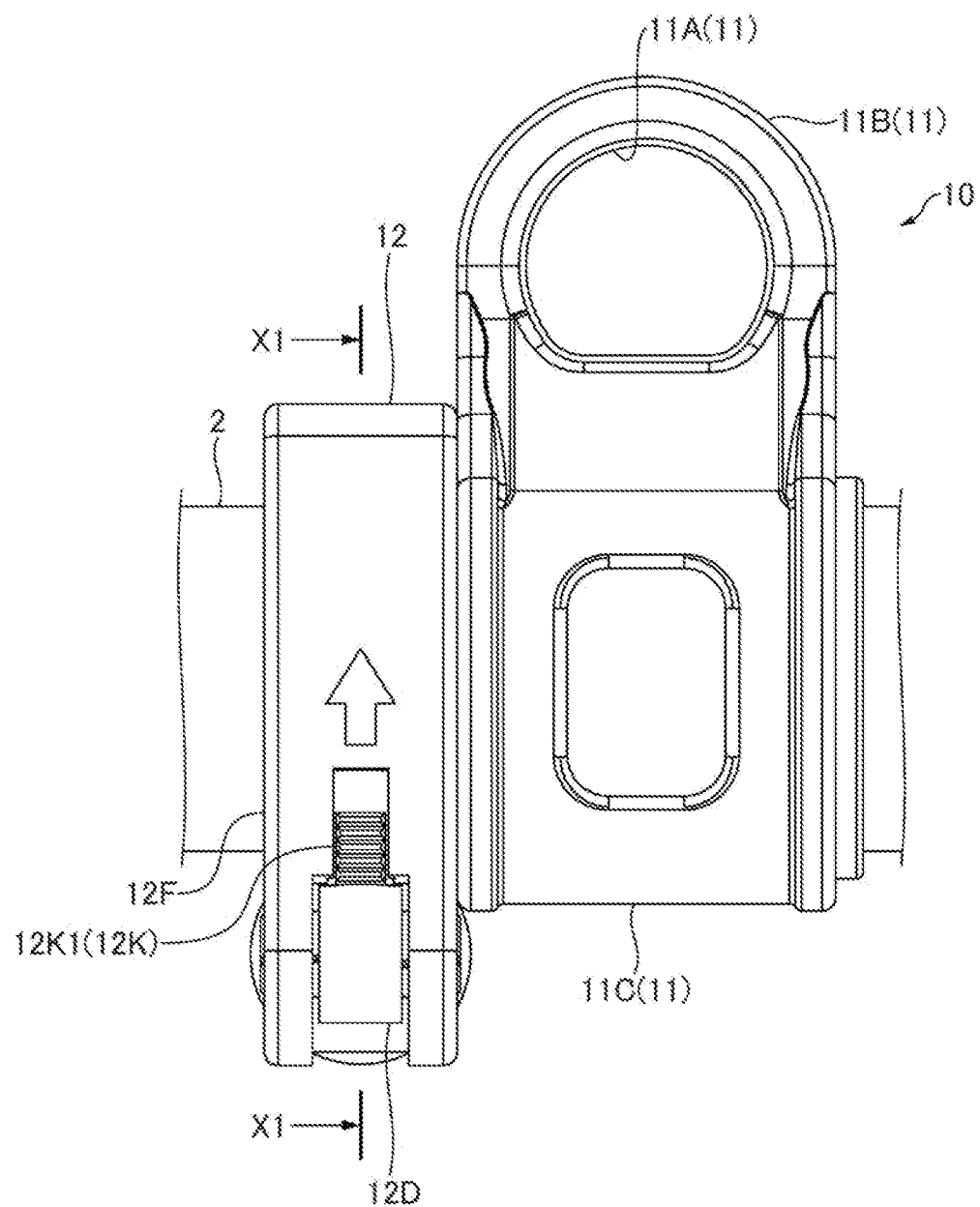
FIG. 2 is a side view illustrating an example of a hanging tool in the fastened and fixed state.
Figure 3:
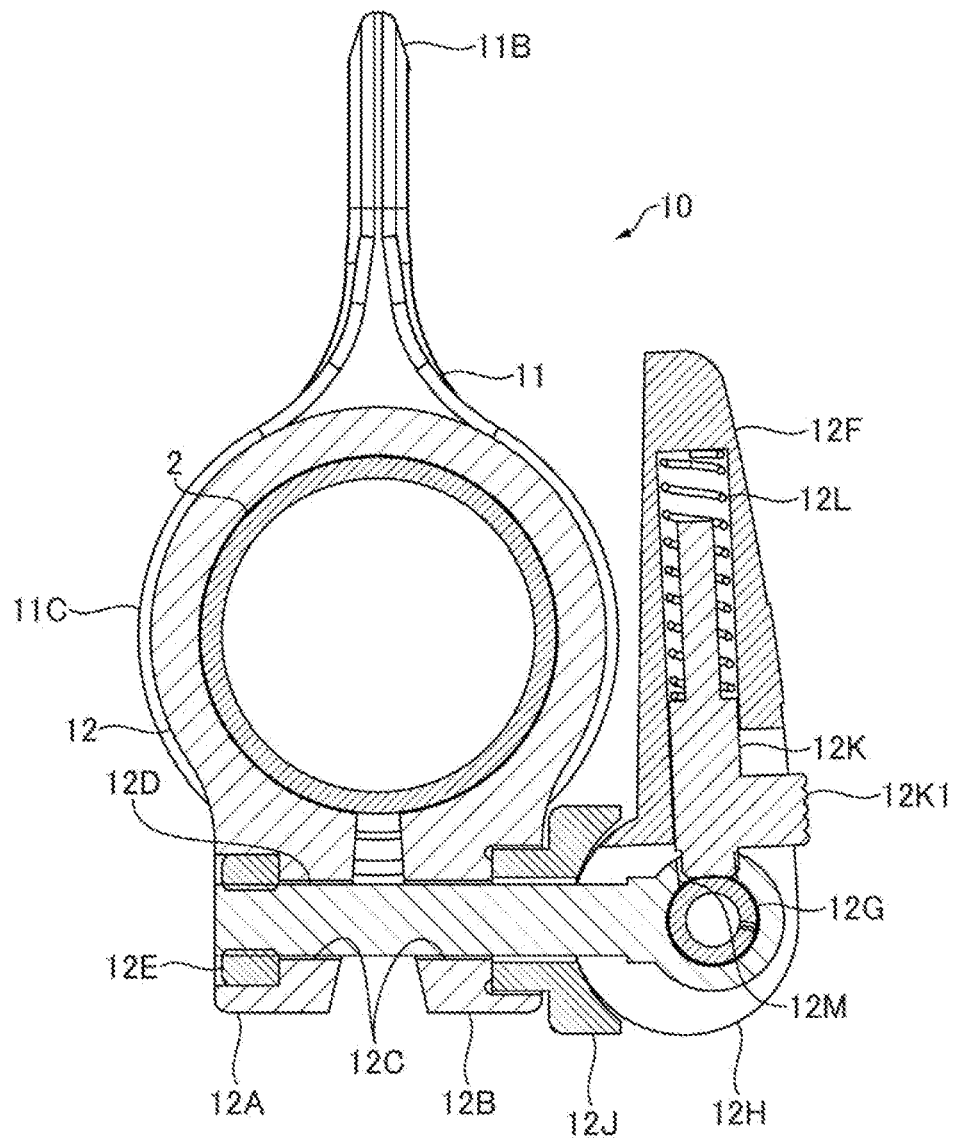
FIG. 3 is a cross-sectional view illustrating an example of the hanging tool taken along line X1-X1 of FIG. 2.
Figure 4:
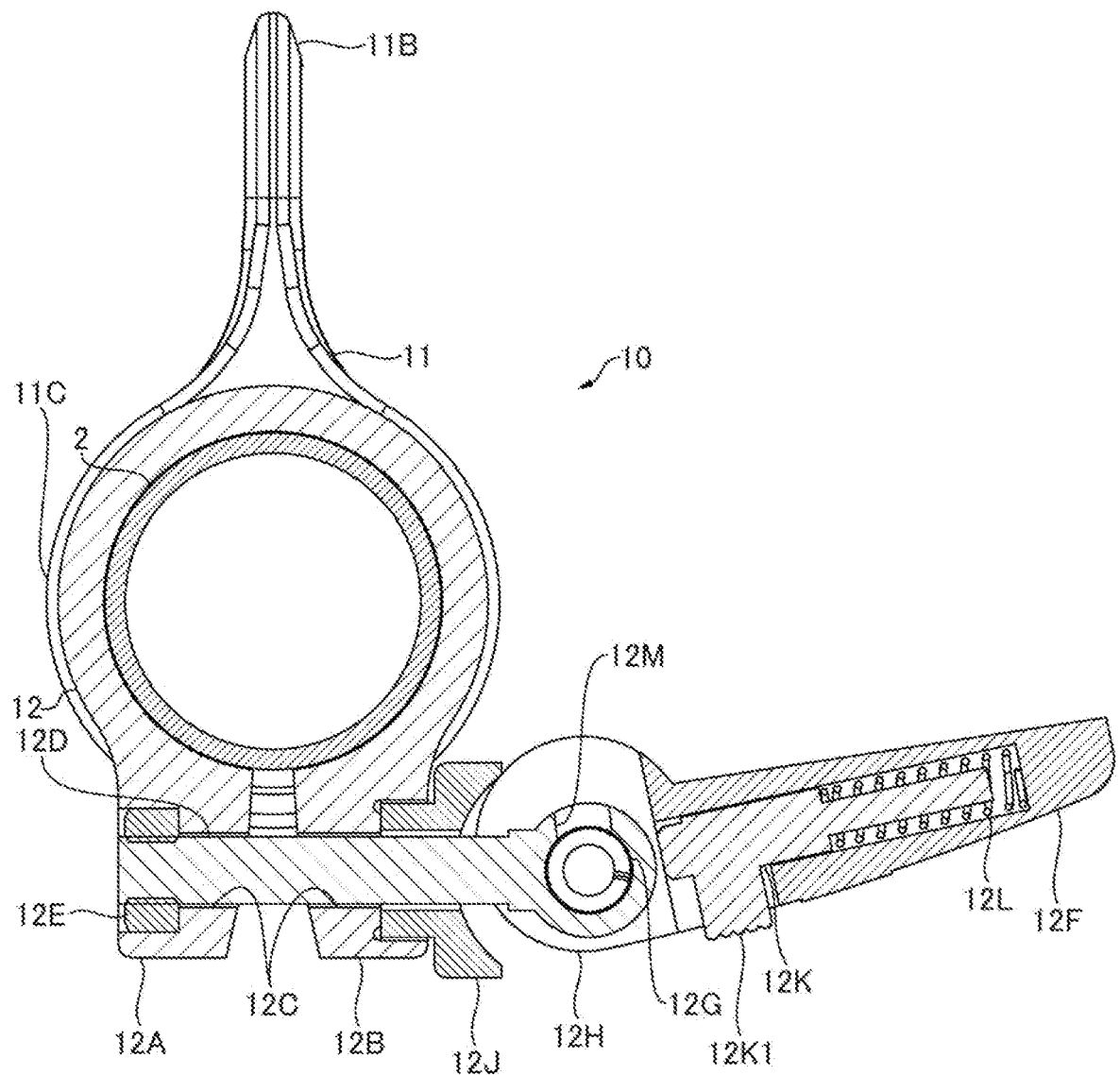
FIG. 4 illustrates a state where an operating lever illustrated in FIG. 3 is rotated to a release position.

FIG. 2 to FIG. 4 illustrate an example of the hanging tool 10 according to the embodiment of the invention. FIG. 2 and FIG. 3 illustrate a state in which the hanging tool 10 is fixed to the operating rod 2. FIG. 4 illustrates a state in which the hanging tool 10 is released from being fixed to the operating rod 2, and therefore can be changed in position.

The hanging tool 10 includes a hanging tool body 11 including a connection hole 11A to connect to the hook 6A of the shoulder belt 6 (see FIG. 1), and a stopper 12 coupled to the hanging tool body 11. The coupling of the stopper 12 to the hanging tool body 11 may mean that the hanging tool body 11 is integrally formed with the stopper 12. The hanging tool body 11 includes a protruding part 11B including the connection hole 11A, and a cylindrical part 11C surrounding the outer circumferential surface of the operating rod 2. The inner diameter of the cylindrical part 11C is slightly greater than the outer diameter of the operating rod 2. Therefore, the hanging tool body 11 can move along the longitudinal direction of the operating rod 2.

The stopper 12 includes a pair of fastening portions 12A and 12B facing one another, and allows the pair of fastening portions 12A and 12B to approach or be spaced from one another while sandwiching the circumference of the operating rod 2. Here, when the pair of fastening portions 12A and 12B approaches one another, the stopper 12 fastens the operating rod 2 to fix the hanging tool 10 to the operating rod 2. As the pair of fastening portions 12A and 12B are spaced from one another, the stopper 12 unfastens the operating rod 2, and therefore the hanging tool 10 is released from being fixed to the operating rod 2.

A through hole 12C orthogonal to the longitudinal direction of the operating rod 2 is provided through the pair of fastening portions 12A and 12B of the stopper 12. An operating shaft 12D is inserted into the through hole 12C, and a first end of the operating shaft 12D is retained not to fall off the through hole 12C. With the illustrated example, the first end of the operating shaft 12D is screwed with nuts 12E fixed to the outside of the through hole 12D. Meanwhile, an operating lever 12F is coupled to a second end of the operating shaft 12D.

The operating lever 12F is operated to allow the stopper 12 to fasten or unfasten the operating rod 2. For the operation in this way, the base end of the operating lever 12F is pivotably supported around a rotating shaft 12G parallel to the operating rod 2 on the second end side of the operating shaft 12D. Then, as illustrated in FIG. 3, the operating lever 12F is rotated around the rotating shaft 12G such that the front end of the operating lever 12F approaches the side surface of the operating rod 2 to fasten the stopper 12. Meanwhile, as illustrated in FIG. 4, the operating lever 12F is rotated around the operating shaft 12G such that the front end of the operating lever 12F comes away from the side surface of the operating rod 2 to unfasten the stopper 12.

To be more specific, the operating lever 12F includes an eccentric cam 12H provided on the base end side and pivotably supported around the rotating shaft 12G. The rotation of the eccentric cam 12H with the rotation of the operating lever 12F allows the pair of fastening portions 12A and 12B to approach or be spaced from one another. The eccentric cam 12H acts on a pressed member 12J disposed along the operating shaft 12D. In the state illustrated in FIG. 3, the eccentric cam 12H presses the pressed member 12J to allow the pair of fastening portions 12A and 12B to approach one another. Meanwhile, in the state illustrated in FIG. 4, the eccentric cam 12H releases the pressing on the pressed member 12J to allow the pair of fastening portions 12A and 12B to be spaced from one another.

In this case, the hanging tool 10 is fixed to the operating rod 2 while the front end of the operating lever 12F is close to the operating rod 2 as illustrated in FIG. 3. Therefore, even though something object touches the operating lever 12F when the worker M performs the work, the operating lever 12F is pressed to the operating rod 2 side, and therefore the operating lever 12 is not rotated in the direction to release the hanging tool 10 from being fixed. In this way, with the structure of the operating lever 12F, it is not likely to release the fixing even through any force is applied to the operating lever 12F without worker M's intention.

In addition, the operating lever 12F is provided with a lock member 12K as illustrated. By this means, the operating lever 12F is not likely to be rotated in the direction to release the hanging tool 10 from being fixed, even though any force is applied to the operating lever 12F without worker M's intention. The lock member 12K has a function to lock the state in which the front end of the operating lever 12F is close to the side surface of the operating rod 2, as illustrated in FIG. 3.

With the illustrated example, the function of the lock member 12K will be specifically described. The lock member 12K is provided in the operating lever 12F, and can slide from the base end to the front end of the operating lever 12F. One end of the lock member 12K is pushed by a spring 12L provided in the operating lever 12F, and therefore slides around the end of the operating shaft 12D, and enters into a lock hole 12M provided in the end of the operating shaft 12D at the position at which the fastening operation of the operating lever 12F is completed, that is, at which the fixing of the hanging tool 10 is completed as illustrated in FIG. 3. By this means, the lock member 12K locks the movement of the operating lever 12F.

In addition, the lock member 12K includes a unlocking part 12K1. This unlocking part 12K1 is operated to move the lock member 12K to the front end of the operating lever 12F. By this means, the end of the lock member 12K is removed from the lock hole 12M to unlock the operating lever 12F. While the end of the lock member 12K is removed from the lock hole 12M, the operating lever 12F is rotated such that the front end of the operating lever 12F comes away from the operating rod 2 as illustrated in FIG. 4. By this means, the hanging tool 10 is released from being fixed.

In this case, the lock member 12K enters into the lock hole 12M at the position at which the fastening operation of the operating lever 12F is completed and therefore to lock the operating lever 12F. On the other hand, the unlocking part 12K1 is moved in the direction of an arrow illustrated in FIG. 2, that is, in the direction of the rotation for the fastening operation of the operating lever 12F, and therefore to unlock the operating lever 12F. Therefore, even when the unlocking part 12K1 moves without the worker M's intention and therefore the lock member 12K is removed from the lock hole 12M, the operating lever 12F is pressed to the operating rod 2 side by the force due to the movement of the unlocking part 12K1. By this means, even when the lock member 12K is moved, the operating lever 12F is not immediately rotated to release the fastening, and therefore the hanging tool 10 remains fixed.

The unlocking part 12K1 is moved to unlock the lock member 12K, but the hanging tool 10 is not released from being fixed by the operating lever 12F unless the operating lever 12F is rotated in the direction opposite to the direction in which the unlocking part 12K1 is moved. Therefore, it is not likely to unlock the operating lever 12F except for the intended operation of the worker M, and therefore not likely to release the hanging tool 10 from being fixed.

Figure 5:
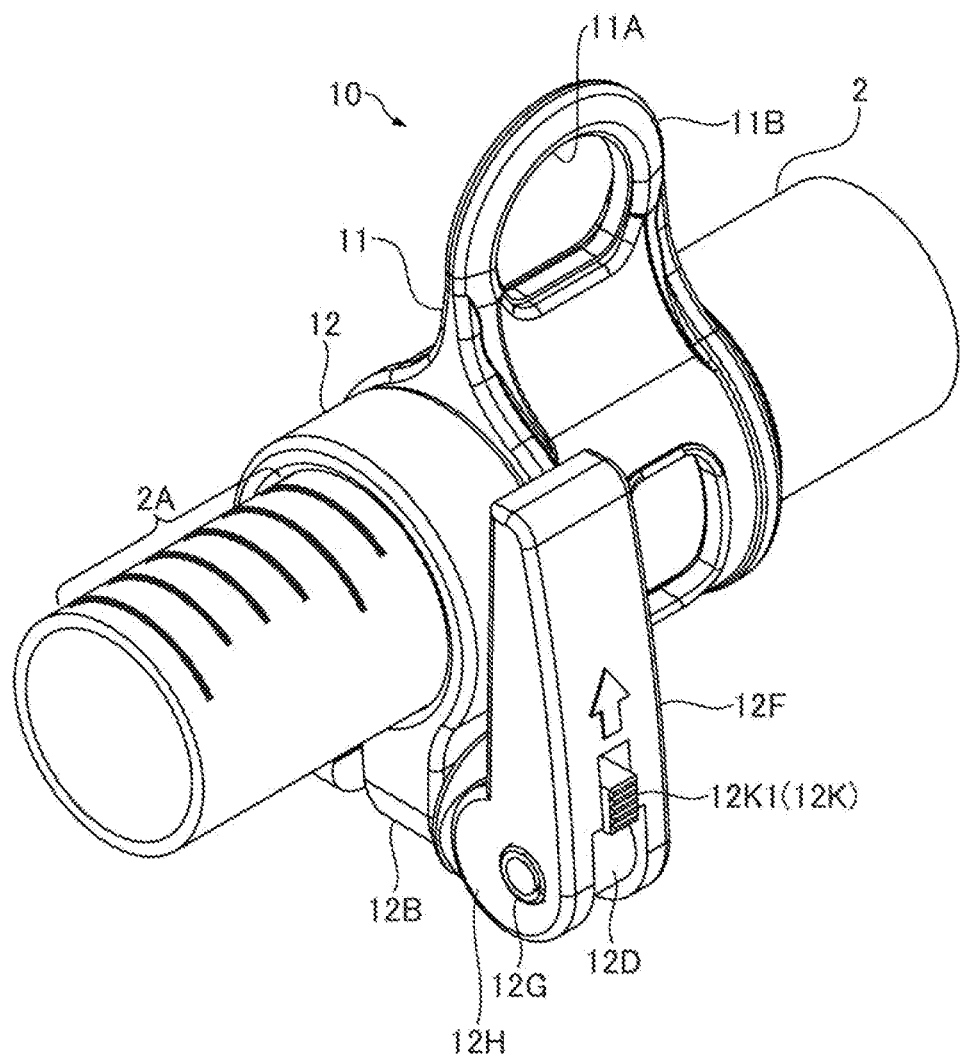
FIG. 5 illustrates a modification of the working machine with the operating rod equipped with the hanging tool.
Figure 6:
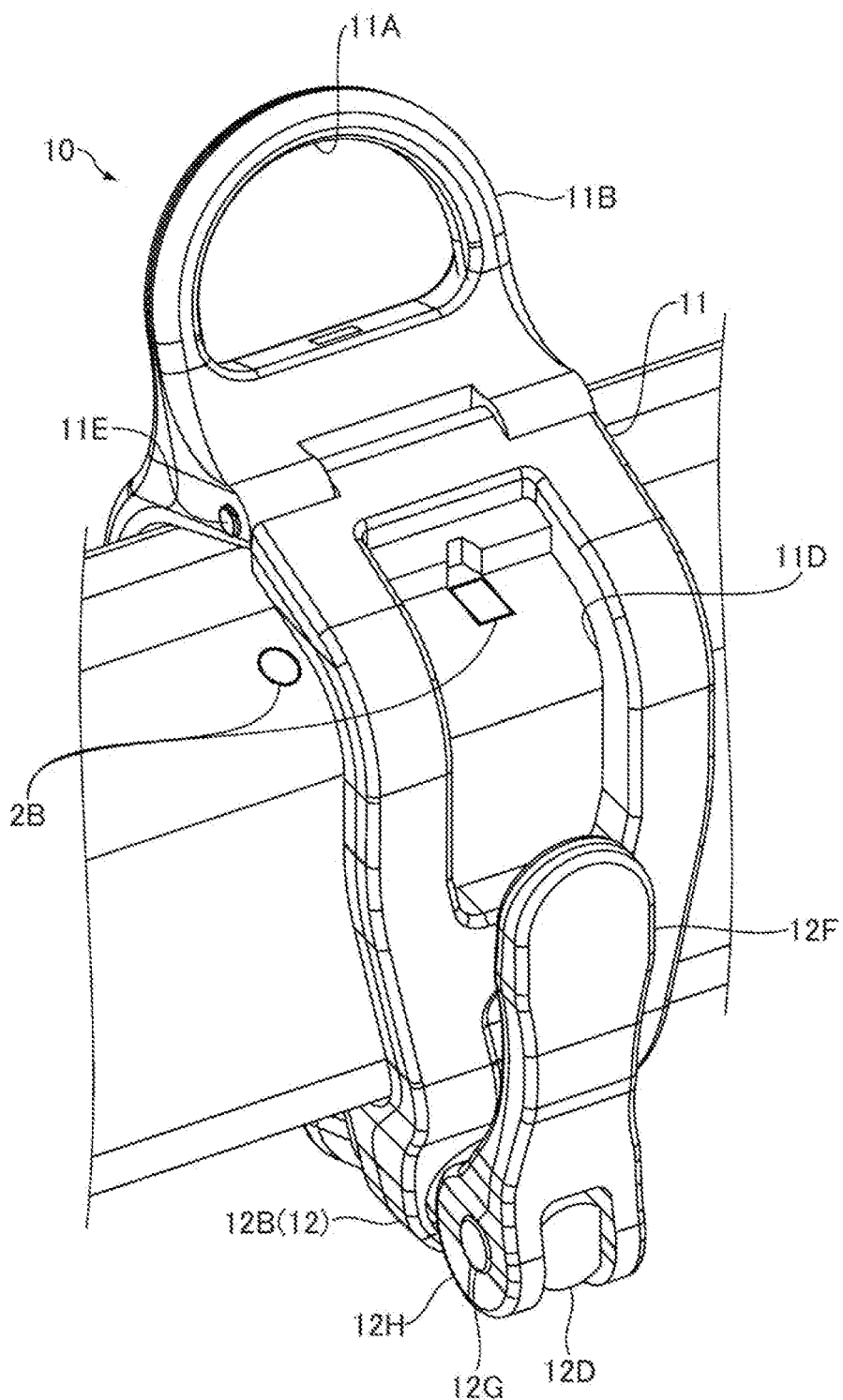
FIG. 6 illustrates a modification of the working machine with the operating rod equipped with the hanging tool.
Figure 7:
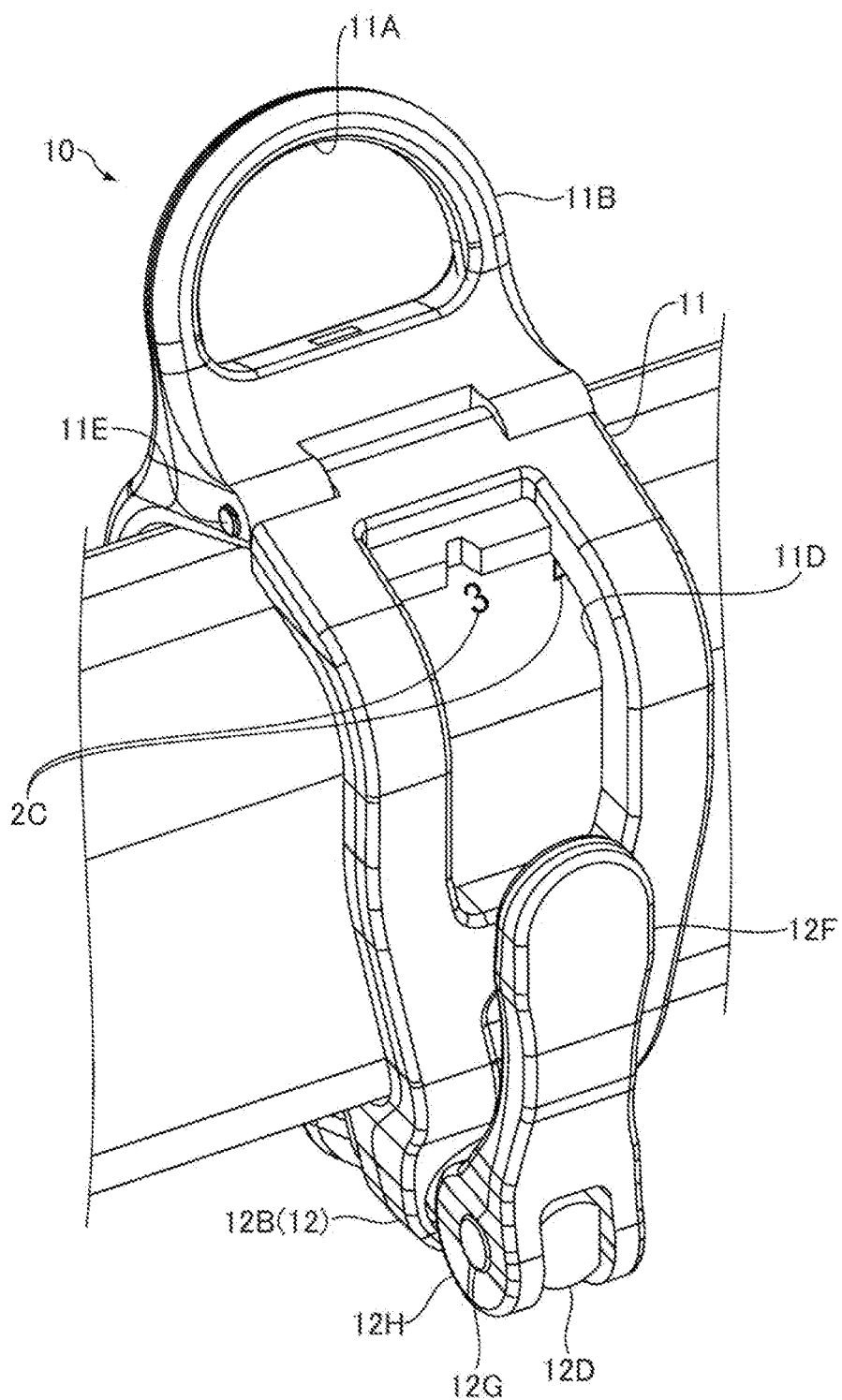
FIG. 7 illustrates a modification of the working machine with the operating rod equipped with the hanging tool.

FIG. 5 to FIG. 7 illustrate modifications of the working machine 1 equipped with the hanging tool 10. With a modification illustrated in FIG. 5, scale lines 2A are applied outer circumferential surface of the operating rod 2 as a marker to determine the position at which the hanging tool 10 is fixed. The scale lines 2A are drawn along the circumference of the operating rod 2, and arranged at a predetermined interval along the longitudinal direction of the operating rod 2. The shorter the interval each between the scale lines 2A is, the more precisely the position of the hanging tool 10 can be adjusted. The end of the stopper 12 or the hanging tool body 11 along the longitudinal direction of the operating rod 2 is aligned with a line of the scale lines 2A. By this means, it is possible to speedily determine the fixing position of the hanging tool 10.

With a modification illustrated in FIG. 6, a symbol 2B is applied to the outer circumferential surface of the operating rod 2, as a marker to determine the fixing position of the hanging tool 10. With this example, an opening 11D is provided on the hanging tool body 11 to see the symbol 2B applied to the outer circumferential surface of the operating rod 2, and a marker such as a notch provided in the opening 11D is aligned with the symbol 2B. By this means, it is possible to determine the fixing position of the hanging tool 10.

With a modification illustrated in FIG. 7, a number 2C is applied to the outer circumferential surface of the operating rod 2, as a marker to determine the fixing position of the hanging tool 10. With this modification, the opening 11D is provided on the hanging tool body 11 to see the number 2C on the outer circumferential surface of the operating rod 2, and a marker such as a notch provided in the opening 11D is aligned with the number 2C. By this means, it is possible to determine the fixing position of the hanging tool 10.

Here, with the modifications illustrated in FIG. 6 and FIG. 7, the operating rod 2 is relatively thick, and the cross section of the operating rod 2 orthogonal to the longitudinal direction is rectangular. With these modifications, the hanging tool body 11 includes a hinge mechanism configured to allow the hanging tool body 11 to open and close around a shaft 11E along the longitudinal direction of the operating rod 2. With this hinge mechanism, the hanging tool body 11 can be opened around the shaft 11E and easily be mounted to the thick and rectangular operating rod 2.

Figure 8A:
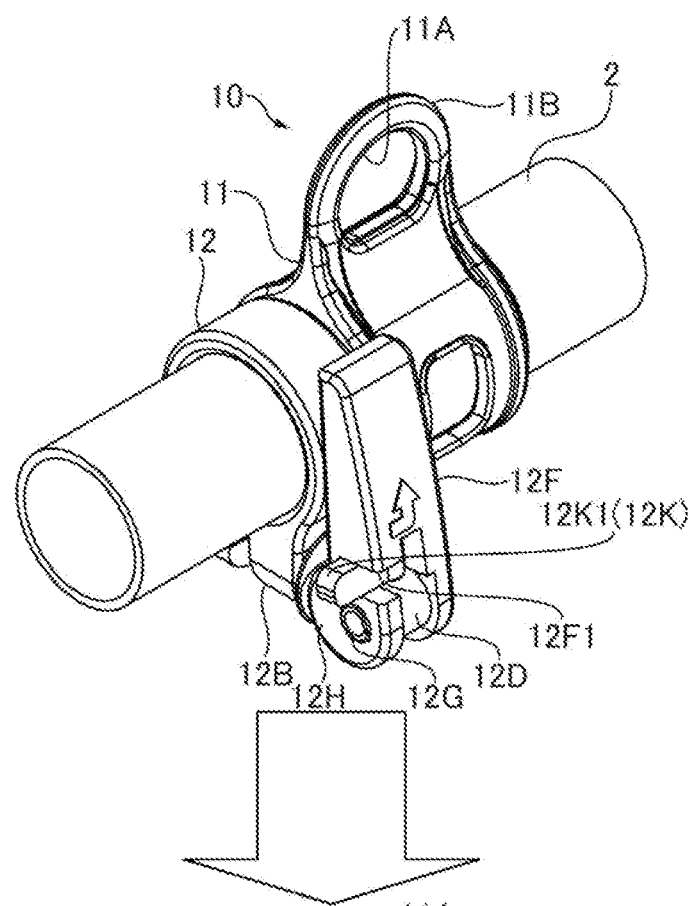
FIGS. 8A and 8B illustrate a modification of the working machine with the operating rod equipped with the hanging tool.
Figure 8B:
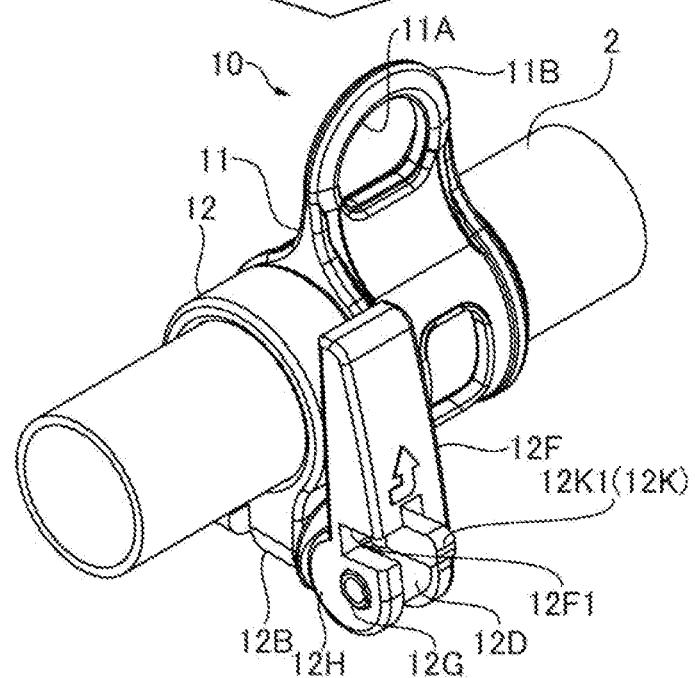
Figure 9:
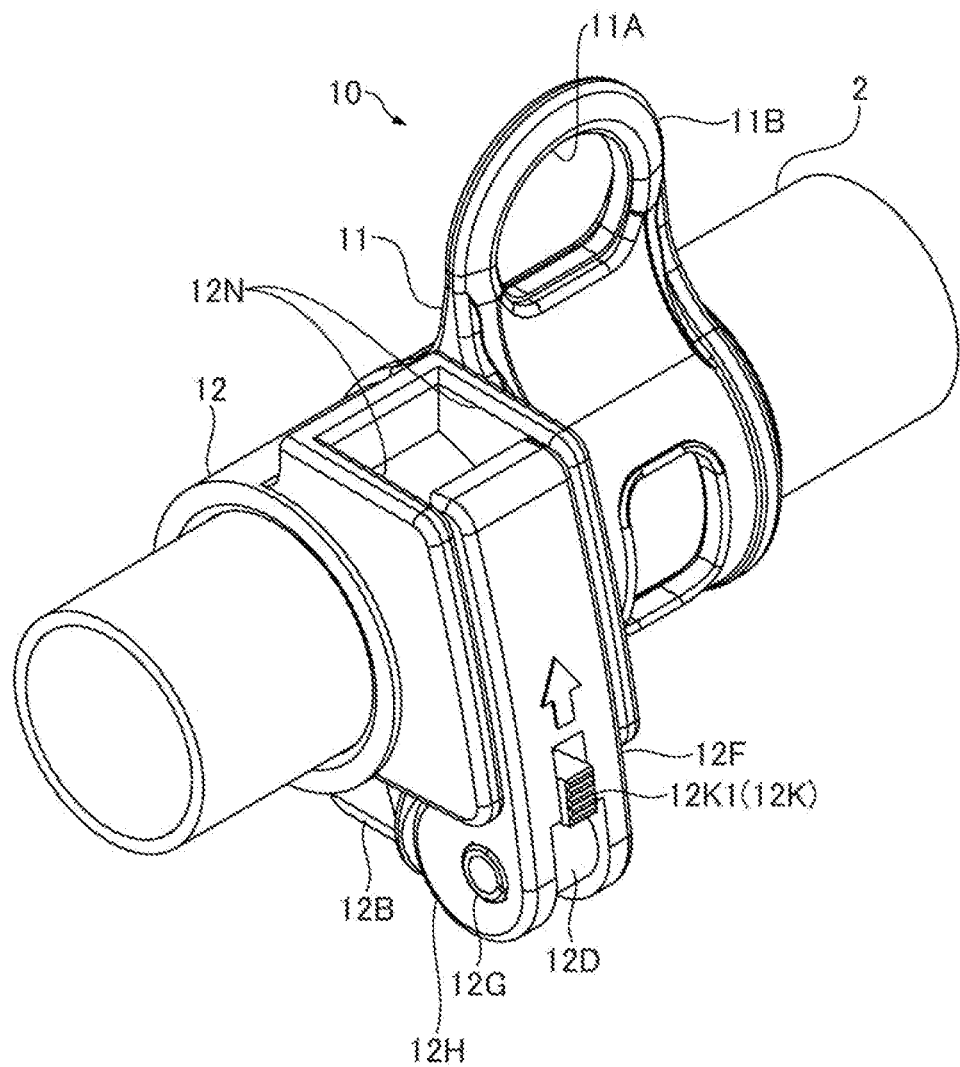
FIG. 9 illustrates a modification of the working machine with the operating rod equipped with the hanging tool.

FIGS. 8A, 8B and FIG. 9 illustrate modifications of the lock member 12K. With these modifications, the operating lever 12F includes an engaging slot 12F1 to engage with the unlocking part 12K1 of the lock member 12K. FIG. 8A illustrates a state where the unlocking part 12K1 is engaged with the engaging slot 12F1 of the operating lever 12F. The unlocking part 12K1 is rotated around the longitudinal axis of the lock member 12K at the locking position of the lock member 12K. By this means, the unlocking part 12K1 is engaged with the engaging slot 12F1.

To release the unlocking part 12K1, the unlocking part 12K1 engaged with the engaging slot 12F1 is rotated for 90 degrees in the reverse direction to remove the unlocking part 12K1 from the engaging slot 12F1 as illustrated in FIG. 8B. Then, the unlocking part 12K1 is moved along the longitudinal direction of the lock member 12K to remove the lock member 12K from the lock hole 12M.

With this modification, in order to release the hanging tool 10 from being fixed by operating the operating lever 12F locked by the lock member 12K, the following operations are performed: first, the unlocking part 12K1 is rotated to remove the unlocking part 12K1 from the engaging slot 12F1, as a first operation; the unlocking part 12K1 removed from the engaging slot 12F1 is moved along the longitudinal direction of the operating lever 12F to remove the lock member 12K from the lock hole 12M as a second operation; and the operating lever 12F is operated to allow the front end of the operating lever 12F to come away from the operating rod 2 as a third operation. Therefore, it is not more likely to release the hanging tool 10 from being fixed by unintended operation of the worker M.

FIG. 9 illustrates a modification of the stopper 12. With this modification, an accommodation part 12N is provided to accommodate the operating lever 12F close to the side surface of the operating rod 2. The accommodation part 12N is provided to surround the operating lever 12F so as not to accidentally apply the force of the worker M to the operating lever 12F while the hanging tool 10 is fixed. By providing the accommodation part 12N, it is possible to prevent that the hanging tool 10 is released from being fixed by unintended operation of the worker M. Here, when this accommodation part 12N is provided, the lock member 12 may be omitted.

According to the embodiment, by operating the operating lever 12F to release the hanging tool 10 from being fixed, the hanging tool 10 can freely move along the longitudinal direction of the operating rod 2. Therefore, the worker M can move the hanging tool 10 to a desired position. Then, the hanging tool 10 having moved to the desired position for the worker M can be speedily and easily fixed to the operating rod 2 by simple operation of the operating lever 12F.

The hanging tool 10 is fixed to the operating rod 2 by the operating lever 12F while the operating lever 12F is close to the operating rod 2. Therefore, the operating lever 12F is not likely to release the fixing by wrong operation of the worker M. Moreover, the operating lever 12 includes the lock member 12K, and therefore it is not more likely to release the hanging tool 10 from being fixed without worker M's intention.

According to the invention having the above-described features, it is possible to speedily and easily change the position of the hanging tool for a shoulder belt according to the weight balance between the front end and the base end of the operating rod of the working machine. In addition, it is possible to prevent release of the fixing of the hanging tool for a shoulder belt by unintended operation. Moreover, it is possible to hang the operating rod from the shoulder belt in an appropriate position.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A working machine with an operating rod configured to perform work while a handle provided on the operating rod is held by a hand, the working machine comprising:
   a working device mounted on a front end of the operating rod;
   a power device mounted on a base end of the operating rod; and
   the operating rod equipped with a hanging tool for a shoulder belt,
   the hanging tool including:
      a hanging tool body including a connection hole to connect to the shoulder belt, and configured to be able to slide in a longitudinal direction of the operating rod while surrounding the operating rod; and
      a stopper coupled to the hanging tool body, and including a pair of fastening portions facing one another, the stopper being configured to allow the pair of fastening portions to approach or be spaced from one another while sandwiching a circumference of the operating rod,
   wherein the fastening portions include a through hole orthogonal to the longitudinal direction of the operating rod,
   a first end of an operating shaft inserted into the through hole is retained not to fall off, and a second end is coupled to an operating lever,
   a base end of the operating lever is pivotably supported around a rotating shaft parallel to the operating rod on the second end side of the operating shaft,
   the operating lever is rotated such that a front end of the operating lever approaches a side surface of the operating rod to fasten the stopper, and
   the operating lever is rotated such that the front end of the operating lever comes away from the side surface of the operating rod to unfasten the stopper.

2. The working machine with an operating rod according to claim 1, wherein:
   the operating lever includes an eccentric cam pivotably supported around the rotating shaft on the base end side; and
   the eccentric cam is rotated with rotation of the operating lever to allow the pair of fastening portions to approach or be spaced from one another.

3. The working machine with an operating rod according to claim 1, wherein the operating lever includes a lock member configured to lock a state in which the front end of the operating lever is close to the side surface of the operating rod.

4. The working machine with an operating rod according to claim 3, wherein the lock member locks the operating lever at a position at which fastening operation of the operating lever is completed, and unlocks the operating lever by unfastening operation in a direction of rotation for the fastening operation of the operating lever.

5. The working machine with an operating rod according to claim 1, wherein the stopper includes an accommodation part configured to accommodate the operating lever close to the side surface of the operating rod.

6. A hanging tool for a shoulder belt mounted to an operating rod of a working machine configured to perform work while a handle provided on the operating rod is held by a hand, the working machine including:
   a working device mounted on a front end of the operating rod; and
   a power device mounted on a base end of the operating rod,
   the hanging tool comprising:
      a hanging tool body including a connection hole to connect to the shoulder belt, and configured to be able to slide in a longitudinal direction of the operating rod while surrounding the operating rod; and
      a stopper coupled to the hanging tool body, and including a pair of fastening portions facing one another, the stopper being configured to allow the pair of fastening portions to approach or be spaced from one another while sandwiching a circumference of the operating rod, wherein the fastening portions include a through hole orthogonal to the longitudinal direction of the operating rod, a first end of an operating shaft inserted into the through hole is retained not to fall off, and a second end is coupled to an operating lever, a base end of the operating lever is pivotably supported around a rotating shaft parallel to the operating rod on the second end side of the operating shaft, the operating lever is rotated such that a front end of the operating lever approaches a side surface of the operating rod to fasten the stopper, and the operating lever is rotated such that the front end of the operating lever comes away from the side surface of the operating rod to unfasten the stopper.

* * * * *